United States Patent [19]

Hong et al.

[11] Patent Number: 4,832,913

[45] Date of Patent: May 23, 1989

[54] HYDROGEN STORAGE MATERIALS USEFUL FOR HEAT PUMP APPLICATIONS

[75] Inventors: Kuochih C. Hong; Krishna Sapru, both of Troy, Mich.

[73] Assignee: Energy Conversion Devices, Inc., Troy, Mich.

[21] Appl. No.: 220,295

[22] Filed: Jul. 18, 1988

Related U.S. Application Data

[63] Continuation of Ser. No. 866,001, Aug. 27, 1986, abandoned, which is a continuation-in-part of Ser. No. 805,016, Dec. 5, 1985, abandoned, which is a continuation-in-part of Ser. No. 791,822, Oct. 28, 1985, abandoned.

[51] Int. Cl.$^4$ .................................. C22C 30/00
[52] U.S. Cl. ......................... 420/581; 420/900; 423/644
[58] Field of Search ............... 420/581, 900; 148/304, 148/403, 442, 902; 423/644, 648 R

[56] References Cited

U.S. PATENT DOCUMENTS

| | | | |
|---|---|---|---|
| 4,431,561 | 2/1984 | Ovshinsky et al. | 252/184 |
| 4,446,101 | 1/1984 | Beinauer et al. | 420/424 |
| 4,551,400 | 11/1985 | Sapru et al. | 429/94 |

Primary Examiner—Christopher W. Brody
Attorney, Agent, or Firm—Richard M. Goldman; Marvin S. Siskind; Kenneth M. Massaroni

[57] ABSTRACT

Disclosed is a class of multicomponent, high capacity hydrogen storage materials suitable for use in a heat pump comprising titanium, vanadium, manganese and iron. The hydrogen storage materials are disordered, multiphase, polycrystalline materials which are predominately vanadium and comprise at least a major crystalline phase substantially surrounded by an intergranular phase, with one or more inclusion phases. The materials are characterized by a Bragg x-ray diffraction pattern with a major peak occurring 43 degrees 2 theta. Also disclosed are processes for making the class of materials and a heat pump system utilizing at least one such material.

1 Claim, 5 Drawing Sheets

HYDROGEN STORAGE MATERIALS USEFUL FOR HEAT PUMP APPLICATIONS

CROSS REFERENCE TO RELATED APPLICATION

This application is a continuation of application Ser. No. 866,001, filed on Aug. 27, 1986, now abandoned, which is a continuation-in-part of our commonly assigned, copending, U.S. application Ser. No. 805,016 filed Dec. 5, 1985 now abandoned which is a continuation-in-part of our commonly assigned U.S. application Ser. No. 791,822 filed Oct. 28, 1985 now abandoned both for Ovonic Heat Pump Systems.

FIELD OF THE INVENTION

The present invention relates to hydrides useful as, e.g., a heat pump material for transferring thermal energy from a low temperature heat source to a high temperature heat sink to provide heating or cooling.

BACKGROUND OF THE INVENTION

It has been recognized that the world supply of fossil fuels for the production of energy is being exhausted at ever increasing rates. This realization has resulted in an energy crisis manifested by frequent episodes of fossil fuel shortages, inflation, recession, and war or the threat of war in the fossil fuel producing regions of the world. Moreover, this realization has exacerbated a flight of industry from the colder climates to warm climates, resulting in severe economic and social stress and dislocations. The recurring energy crises threaten peace, stability, and economic growth and development.

A solution to the energy crisis lies in harvesting energy from heretofore underutilized energy sources and in more effective use of energy from existing energy sources. To that end, the present invention deals with energy harvesting, as well as with energy conservation, pollution control, and economic growth. It does this by the development of new hydrogen storage materials particularly suited for use in heat pumps.

Conventional heat pumps are of the compressor type. The compressor is noisy, consumes large amounts of electrical power, requires frequent maintenance, is a source of vibration, and use environmentally undesirable fluorocarbon refrigerants. Because of these numerous drawbacks, much research has gone into the development of chemical heat pumps, particularly hydride heat pumps. See, for example, U.S. Pat. No. 4,044,819, issued to Cottingham, U.S. Pat. No. 4,200,144 issued to Sirovich, and "Metal Hydride Heat Pump", D. A. Rohy, T. A. Argabright and G. D. Wade, Proc, 17th Inter Soc Energy Conv Eng Conf (1982) for descriptions of typical hydride heat pump systems.

These hydride heat pumps operate on the principle of reversible storage of hydrogen. This is explained as shown below:

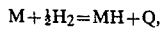

$$M + \tfrac{1}{2}H_2 = MH + Q,$$

where M is a hydride former. M reacts with hydrogen to form a hydride MH. This process is exothermic and it releases a quantity of heat, Q, which can be usefully utilized. On the other hand, the reverse reaction involves supplying a quantity of heat, Q, to the hydride, MH, to regenerate the original hydride former M, releasing hydrogen and producing a cooling effect. This process of producing heating and/or cooling effect involves only the transfer of hydrogen, thus eliminating the need for a compressor. As a result the problems of the compressor type heat pump, i.e., the noise, vibration, and other problems are reduced or eliminated.

In a typical hydride heat pump system, two different metal alloy hydrides are paired. The hydrides are contained in beds which are thermally and physically isolated, but interconnected to permit the flow of hydrogen. This is represented schematically by FIG. 1. Initially, hydride A is substantially hydrided and hydride B is substantially unhydrided.

A typical heat pump cooling cycle consists of four steps, which are illustrated in FIG. 2. As shown in the FIGURE:

Step 1—Isothermal Hydrogen Desorption at A and Absorption at B

Bed A receives the heat $Q_{CA}$ at $T_C$. Bed B absorbs hydrogen (released from A) and deilvers the heat $-Q_{MB}$ to the surroundings at $T_M$.

Step 2—Sensible Heating

Bed A is heated to $T_M$ from $T_C$, absorbing heat $Q_{SA}$. Bed B is heated to $T_H$ from $T_M$, absorbing heat $Q'_{SB}$.

Step 3—Isothermal Hydrogen Desorption at B and Absorption at A

Bed B receives heat ($Q_{HB}$) from a heat source at $T_H$. Bed A absorbs hydrogen released from B and delivers the heat $-Q_{MA}$ to a heat sink at $T_M$.

Step 4—Sensible Cooling

Bed A releases the heat $-Q'_{SA}$ and is cooled from $T_M$ to $T_C$, back to its original state. Bed B releases the heat $-Q_{SB}$ and is also cooled from $T_H$ to $T_M$, back to its original state.

Different hydrides will display differing pressure versus composition (H/M) profiles. At a given temperature, each hydride will have a characteristic pressure at which it will begin to absorb significant amounts of hydrogen. The pressure will remain relatively constant until a characteristic quantity of hydrogen is absorbed. At that point, exposing the hydride to more hydrogen will not cause a significant composition change. In order for hydrogen to flow from the bed containing hydride A to the bed containing hydride B during Step 1, the hydride pair must display properties such that there is an appropriate pressure differential between A and B at temperatures $T_C$ and $T_M$, as shown above. Likewise, in order for hydrogen to flow from bed B to bed A during Step 3, the pair of hydrides must have properties such that there is a sufficient pressure differential between B and A at temperatures $T_H$ and $T_M$ respectively.

See "A Thermodynamic Analysis of a Metal Hydride Heat Pump", A. Abelson and J. S. Horowitz, Argonne National Laboratory, No. 809427, for a fuller discussion of the thermodynamic considerations.

By providing pairs of matched hydrides operating in alternating sequence, it is possible to provide continuous cooling to a load. Also, by exploiting the exothermic reaction of hydrogen absorption, it is also possible to employ the hydride heat pump as a heating device.

In addition the hydride heat pump can use any source of heat; i.e., gas, electricity, solar, waste heat, ground water, etc, thus providing for more efficient and flexible energy utilization. Due to the modular, solid state nature of the hydride system and because hydrogen gas is the only working medium, these systems also allow packaging flexibility.

Solid hydrides suitable for the reversible storage of hydrogen in heat pump applications must have several characteristics, such as: the useful capacity must be large at a given operating temperature; they must have the ability to operate over a broad range of temperatures; they must have good hydrogen absorption/desorption kinetics; the materials must be structurally stable to ensure long cycle life; the hysterisis between hydrogen absorption and desorption pressures of the materials should be small; the thermal conductivity of the materials should be reasonably high; and the cost should be reasonably low. If the materials fail to possess any one of these characteristics, they will not find acceptance for wide scale commercial utilization.

A relatively low desorption temperature is necessary for efficient utilization of the available exhaust heat from vehicles, machinery, or other similar equipment.

Reversibility is needed to enable the hydrogen storage material to be capable of repeated absorption-desorption cycles without significant loss of its hydrogen storage capabilities. Favorable kinetics are necessary to enable hydrogen to be absorbed or desorbed in a relatively short period of time.

While the design of the hydride heat pump system in respect to apparatus has developed some sophistication, hydride materials development has lagged. No hydride material found in the prior art meets all the requirements necessary for commercial exploitation in heat pump systems.

In the field of hydrogen storage materials, the most commonly prepared systems are based on single phase crystalline bi-metal or tri-metal hydride alloys. Such prior art crystalline materials, however, have not been able to meet even the minimum requirements necessary for wide scale commercial acceptance. A basic limitation of many of the prior art crystalline materials have been their low hydrogen storage capacity relative to the weight of the material.

Another limitation is that many of these materials possess desorption temperatures which are unreasonably high for many applications.

Many of the prior art crystalline materials also are quite susceptible to poisoning by exposure to contaminants in the hydrogen gas or from the ambient environment. For example, many crystalline materials can be poisoned by the presence of oxygen at levels as low as parts per million concentrations. Once contaminated, the storage characteristics of the materials degrade significantly, thereby rendering these materials unacceptable for use without reactivating the materials, which is expensive and complicated.

The density of hydrogen storage sites or interstitial sites is also limited due to specific stoichiometries in the single phase crystalline host structures. In single phase crystalline host materials, the catalytically active sites are relatively limited in number and result from accidentally occurring surface irregularities which interrupt the periodicity of the single phase crystalline structure. A few examples of such surface irregularities are dislocation sites, crystal steps, surface impurities, and foreign absorbates. These irregularities typically occur only in relatively few numbers on the surface of a single phase crystalline material and not throughout its bulk.

The density of catalytically active sites can be increased to a limited extent by mechanical cracking of the single phase crystalline structure or by forming a powder therefrom to increase the surface area. The powders can present a utilization problem, because when the stored hydrogen is later released from the hydride, the powder particles or fractioned segments thereof may be in and carried off by the hydrogen gas as the gas is pumped to its point of utilization as a fuel.

The prior art metallic host single phase crystalline hydrogen storage materials include magnesium, magnesium-nickel, vanadium, iron-titanium, lanthanum pentanickel and others. No such prior art material, however, has all of the required properties i.e., useful storage capacity at operational temperatures, acceptable absorption/desorption kinetics, etc. required for a hydride heat pump medium with widespread commercial utilizability. For example, a crystalline magnesium hydride is theoretically capable of storing hydrogen at approximately 7.6% by weight computed using the formula:

$$\text{percent storage} = H/(H+M),$$

where H is the weight of the hydrogen stored and M is the weight of the storage material (all storage percentages hereinafter referred to are computed based on this formula). However, magnesium's other hydrogen storage characteristics make it commercially unaccceptable for widespread use as a heat pump material.

Magnesium is very difficult to activate. For example, U.S. Pat. No. 3,479,165 discloses that it is necessary to activate magnesium to eliminate surface barriers. This activation must occur at temperatures of 400° C. to 425° C. and at a pressure of 1000 psi for a period of several days in order to obtain a reasonable (90%) conversion to the hydride state. Furthermore, desorption of such hydrides typically requires heating to relatively high temperatures before hydrogen desorption begins. The aforementioned patent states that the $MgH_2$ material must be heated to a temperature of 277° C. before desorption initiates. Even significantly higher temperatures and times are required to reach an acceptable operating output. The high desorption temperature makes the magnesium hydride unsuitable for many applications, in particular applications wherein it is desired to utilize waste heat for desorption, such as exhaust heat from combustion engines. The high temperature and high pressure required in the charging process also limit the use of magnesium in many applications.

The other aforementioned single phase crystalline materials also have not achieved commercial acceptance. For example, $Mg_2NiH_4$ does not have matching pairs with proper pressure composition profiles to extract enough hydrogen at operational conditions to be useful in a heat pump. $VH_2$ and $LaNi_5H_6$ are too expensive for commercial use. Another disadvantage in some of the prior art materials has been the lack of ability to charge the materials in an acceptable amount of time. In summary, none of the prior art hydrogen storage materials have all the desired properties necessary for commercial acceptability.

One alloy system that has been utilized as a hydrogen storer is that containing various combinations of titanium, vanadium, manganese and iron. See, for example, U.S. Pat. No. Re. 30,083 in the name of Reilly et al, which is a reissue of U.S. Pat. No. 3,922,872, U.S. Pat. No. 4,358,316 in the name of Liu et al, U.S. Pat. No. 4,457,891 in the name of Bernauer et al, and U.S. Pat. No. 4,488,906 in the name of Gondo et al. All of these references teach the use of an alloy with a major phase of either titanium or manganese, and little or no vanadium. U.S. Pat. No. 4,446,101 in the name of Bernauer et al does disclose a material with a higher fraction of vanadium. However, no dislcosure is made as to the material's structure or pressure versus (H/M) behavior.

While it has been postulated that a particular crystalline structure is required for hydrogen storage, see, for example, "Hydrogen Storage in Metal Hydride", *Scientific American*, Vol. 242, No. 2, pp. 118-129, February, 1980, it is possible to overcome many of the disadvantages of the prior art materials by utilizing a different class of materials, disordered hydrogen materials. For example, U.S. Pat. No. 4,265,720 to Guenter Winstel for "Storage Materials for Hydrogen" describes a hydrogen storage body of amorphous or finely crystalline silicon. The silicon is preferably a thin film in combination with a suitable catalyst and on a substrate.

Laid-open Japanese Patent Application No. 55-167401, "Hydrogen Storage Material," in the name of Matsumato et al, discloses bi or tri element hydrogen storage materials of at least 50 volume percent amorphous structure. The first element is chosen from the group Ca, Mg, Ti, Zr, Hf, V, Nb, Ta, Y and lanthanides, and the second from the group Al, Cr, Fe, Co, Ni, Cu, Mn and Si. A third element from the group B, C, P and Ge can optionally be present. According to the teaching of No. 55-167401, the amorphous structure is needed to overcome the problem of the unfavorably high desorption temperature characteristic of most crystalline systems. A high desorption temperature (above, for example, 150° C.) severely limits the uses to which the system may be put. For example, a heat pump used as an air conditioner would have to perform at ambient temperatures. The materials suggested by Matsumoto et al do not have suitable matching pairs with appropriate pressure versus composition curves.

According to Matsumoto et al, the material of at least 50% amorphous structure will be able to desorb at least some hydrogen at relatively low temperatures because the bonding energies of the individual atoms are not uniform, as is the case with crystalline material, but are distributed over a wide range. Such an amorphous material will not have the flat hysteresis curve (pressure isotherm) characteristic of crystalline materials. Hence, at least some hydrogen will be desorbed at a relatively low temperature.

Matsumoto et al claims a material of at least 50% amorphous structure. While Matsumoto et al does not provide any further teaching about the meaning of the term "amorphous," the scientifically accepted definition of the term encompasses a maximum short range order of about 20 Angstroms or less.

The use by Matsumato et al of amorphous structure materials to achieve better desorption kinetics due to the non-flat hysteresis curve is an inadequate and partial solution. The other problems found in crystalline hydrogen storage materials, particularly low useful hydrogen storage capacity at ambient temperature, remain.

However, even better hydrogen storage results, i.e., long cycle life, good physical strength, low absorption/desorption temperatures and pressures, reversibility, and resistance to chemical poisoning, may be realized if full advantage is taken of modification of disordered metastable hydrogen storage materials. Modification of disordered structurally metastable hydrogen storage materials is described in the commonly assigned U.S. Pat. No. 4,431,561 of Stanford R. Ovshinsky, Krishna Sapru, Krystyna Dec, and Kuochih Hong, for "Hydrogen Storage Materials and Method of Making the Same". As described therein, disordered hydrogen storage materials, characterized by a chemically modified, thermodynamically metastable structure, can be tailor-made to possess all the hydrogen storage characteristics desirable for a wide range of commercial applications. The modified hydrogen storage material can be made to have greater hydrogen storage capacity than do the single phase crystalline host materials. The bonding strengths between the hydrogen and the storage sites in these modified materials can be tailored to provide a spectrum of bonding possibilities thereby to obtain desired absorption and desorption characteristics. Disordered hydrogen storage materials having a chemically modified, thermodynamically metastable structure also have a greatly increased density of catalytically active sites for improved hydrogen storage kinetics and increased resistance to poisoning.

The synergistic combination of selected modifiers incorporated in a selected host matrix provides a degree and quality of structural and chemical modification that stabilizes chemical, physical, and electronic structures and conformations amenable to hydrogen storage.

The framework for the modified hydrogen storage materials is a lightweight host matrix. The host matrix is structurally modified with selected modifier elements to provide a disordered material with local chemical environments which result in the required hydrogen storage properties.

Another advantage of the host matrix described by Ovshinsky, et al. is that it can be modified in a substantially continuous range of varying percentages of modifier elements. This ability allows the host matrix to be manipulated by modifiers to tailor-make or engineer hydrogen storage materials with characteristics suitable for particular applications. This is in contrast to multicomponent single phase host crystalline materials which generally have a very limited range of stoichiometry available. A continuous range of control of chemical and structural modification of the thermodynamics and kinetics of such crystalline materials therefore is not possible.

A still further advantage of these disordered hydrogen storage materials is that they are much more resistant to poisoning. As stated before, these materials have a much greater density of catalytically active sites. Thus, a certain number of such sites can be sacrificed to the effects of poisonous species, while the large number of unpoisoned active sites still remain to continue to provide the desired hydrogen storage kinetics.

Another advantage of these disordered materials is that they can be designed to be mechanically more flexible than single phase crystalline materials. The disordered materials are thus capable of more distortion during expansion and contraction allowing for greater mechanical stability during the absorption and desorption cycles.

SUMMARY OF THE INVENTION

According to the present invention, it is now possible to provide disordered, modified hydrogen storage materials of even higher hydrogen storage capacity, and enhanced hydrogen storage properties. These materials are particularly suited for use in hydride heat pump systems.

According to the present invention there is provided a novel class of disordered, multicomponent, multiphase, polycrystalline hydrogen storage materials. These materials have a plurality of phases, with compositional and structural order within each phase and compositional and structural disorder between phases. The resulting disordered, multicomponent, multiphase, polycrystalline materials have a high hydrogen storage capacity and high reversibility. In a preferred exemplification, the material comprises at least two phases: a major crystalline phase in which V strongly predominates and an intergranular phase in which T, V and Fe predominate. Optionally, other inclusion phases may be present in which Ti may strongly predominate.

In a particularly preferred embodiment, the multicomponent, multiphase, polycrystalline material has a nominal composition of $Ti_aV_bMn_cFe_d$, where $0.5 \leq a \leq 0.75$, $1.15 \leq b \leq 1.65$, $0.9 \leq a+c \leq 1.31$, and $1.6 \leq b+d \leq 2.0$. The major crystalline phase is represented by the stochiometric formula $Ti_aV_bMn_cFe_d$, where $12 \leq a \leq 18$, $53 \leq b \leq 59$, $9 \leq c \leq 11$, and $17 \leq d \leq 21$, and the continuous intergranular phase has the stochiometry $Ti_aV_bMn_cFe_d$, where $31 \leq a \leq 36$, $23 \leq b \leq 26$, $10 \leq c \leq 12$, and $29 \leq d \leq 34$.

These materials are capable of reversibly storing relatively large amounts of hydrogen, e.g., above about 1.45 weight percent hydrogen. The materials are further characterized by favorably pressure-temperature-rate hydriding and dehydriding kinetics.

Unlike the prior art materials, both crystalline or amorphous, the materials of the present invention are of a disordered, polycrystalline structure.

A thermochemical heat pump utilizing the class of hydride materials of the present invention is also claimed herein. The heat pump contains at least one pair of hydride beds with a connector between them to allow hydrogen to pass between the beds. At least one bed is comprised of a hydride of the class of multicomponent, multiphase, polycrytalline material of the present invention.

THE DRAWINGS

The invention maybe more particularly understood by reference to the drawings appended hereto.

DETAILED DESCRPTION OF THE INVENTION

Figure 1:
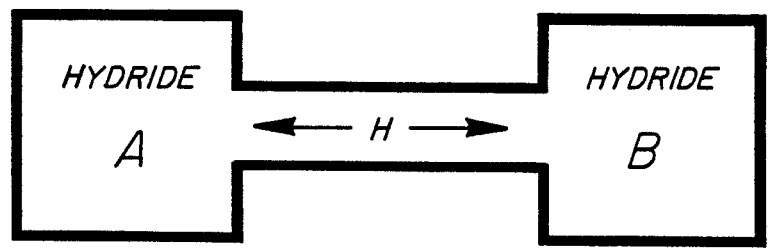
FIG. 1 is a schematic representation of a two bed hydride heat pump.
Figure 2:
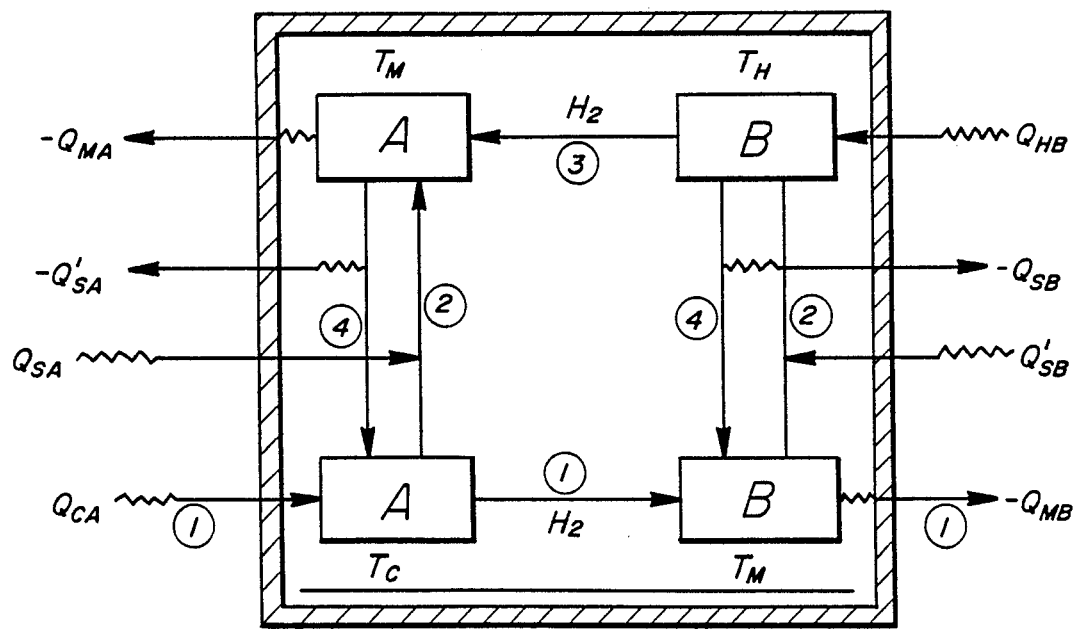
FIG. 2 is a hypothetical pressure versus (H/M) diagram for a pair of hydride materials.

The class of materials of the present invention is a disordered, multicomponent, multiphase, polycrystalline hydrogen storage class. By the term "disordered" is meant that the material is characterized by the absence of compositional and structural order between phases, and by the presence of such order within a phase. The material can be amorphous, polycrystalline (but lacking long range compositional order), or microcrystalline in structure or an intimate mixture of any combination of those phases. The novel class of hydrogen storage materials herein disclosed is multiphase, with predominantly a polycrystalline structure. By "disordered" is meant the absence of long range structural and compositional order between phases. By the term "polycrystalline" is meant that the material's local structural order and, crystallite size of the major phase is of the range of at least 300 Angstroms. In a preferred exemplification, the local structural order and crystallite size are between 5 and 100 microns. In a particularly preferred exemplification, the crystallite size is between 10 and 15 microns.

The material of the present invention is multiphase, comprising at least a major crystalline phase which is substantially surrounded by an intergranular phase. Optionally, one or more inclusion phases may also be present. While not wishing to be bound by the following explanation, the inventors believe that the intergranular phase which substantially surrounds the crystallite may serve as a hydrogen conduit for carrying hydrogen to and from the crystallites during the absorption and desorption processes. It is also believed that the one or more inclusion phases may catalytically aid the absorption and desorption of hydrogen into and out of the hydride.

The various phases of the herein described material include a predominant crystalline phase which is surrounded by an intergranular phase. There are also two separate inclusion phases, which occur sporadically throughout the material.

The samples were prepared by induction melting. The nominal composition of the samples are given in Table I below. The constituent elements, titanium, vanadium, manganese and iron, which were powdered and of laboratory grade, were thoroughly mixed together, heated in a rf induction furnace until melting was completed, and then cooled to form a solidified ingot. The ingot was then reduced in size by conventional methods to form the material of the present invention.

TABLE I

| Sample # | Nominal Composition | Hwt. % |
|---|---|---|
| 108 | $Ti_{33}Mn_{10}V_{47}Fe_{20}$ | 1.80 |
| 110 | $Ti_{33}Mn_{10}V_{43}Fe_{24}$ | 1.85 |
| 116 | $Ti_{23}Mn_{13}V_{40}Fe_{24}$ | 1.60 |
| 115 | $Ti_{33}Mn_{10}V_{47}Fe_{10}$ | 2.80 |
| 117 | $Ti_{33}Mn_{13}V_{47}Fe_{7}$ | 2.9 |

Optionally, the powdered material may then be activated by subjecting it to hydrogen under pressure. In one preferred exemplification, ambient temperature activation is performed under a hydrogen atmosphere at a pressure of at least 450 psi for at least 30 minutes. According to another preferred exemplification, the activation is performed at a temperature of at least 200° C., with the pressure of the hydrogen atmosphere being at least 200 psi. This elevated temperature activation method takes at least 10 minutes.

In a particularly preferred embodiment, the multicomponent, multiphase, polycrystalline material has a nominal composition of $Ti_aV_bMn_cFe_d$, where $0.5 \leq a \leq 0.75$, $1.15 \leq b \leq 1.65$, $0.9 \leq a+c \leq 1.31$, and $1.6 \leq b+d \leq 2.0$. The major crystalline phase is represented by the stochiometric formula $Ti_aV_bMn_cFe_d$, where $12 \leq a \leq 18$, $53 \leq b \leq 59$, $9 \leq c \leq 11$, and $17 \leq d \leq 21$, and the continuous intergranular phase has the stochiometry $Ti_aV_bMn_cFe_d$, where $31 \leq a \leq 36$, $23 \leq b \leq 26$, $10 \leq c \leq 12$, and $29 \leq d \leq 34$.

Figure 3A:
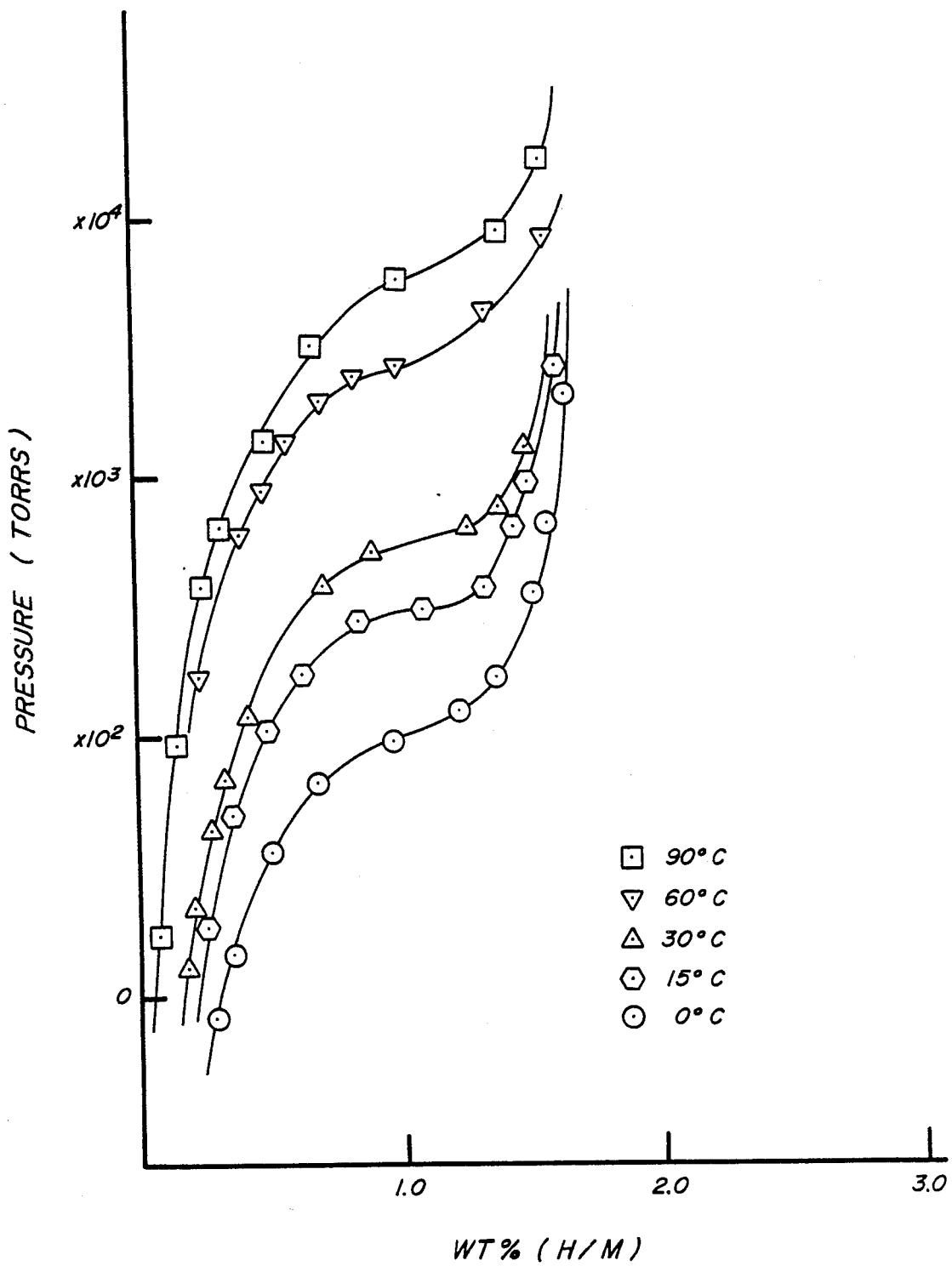
FIGS. 3a and 3b are Bragg x-ray diffraction patterns of samples of the herein disclosed materials.
Figure 3B:
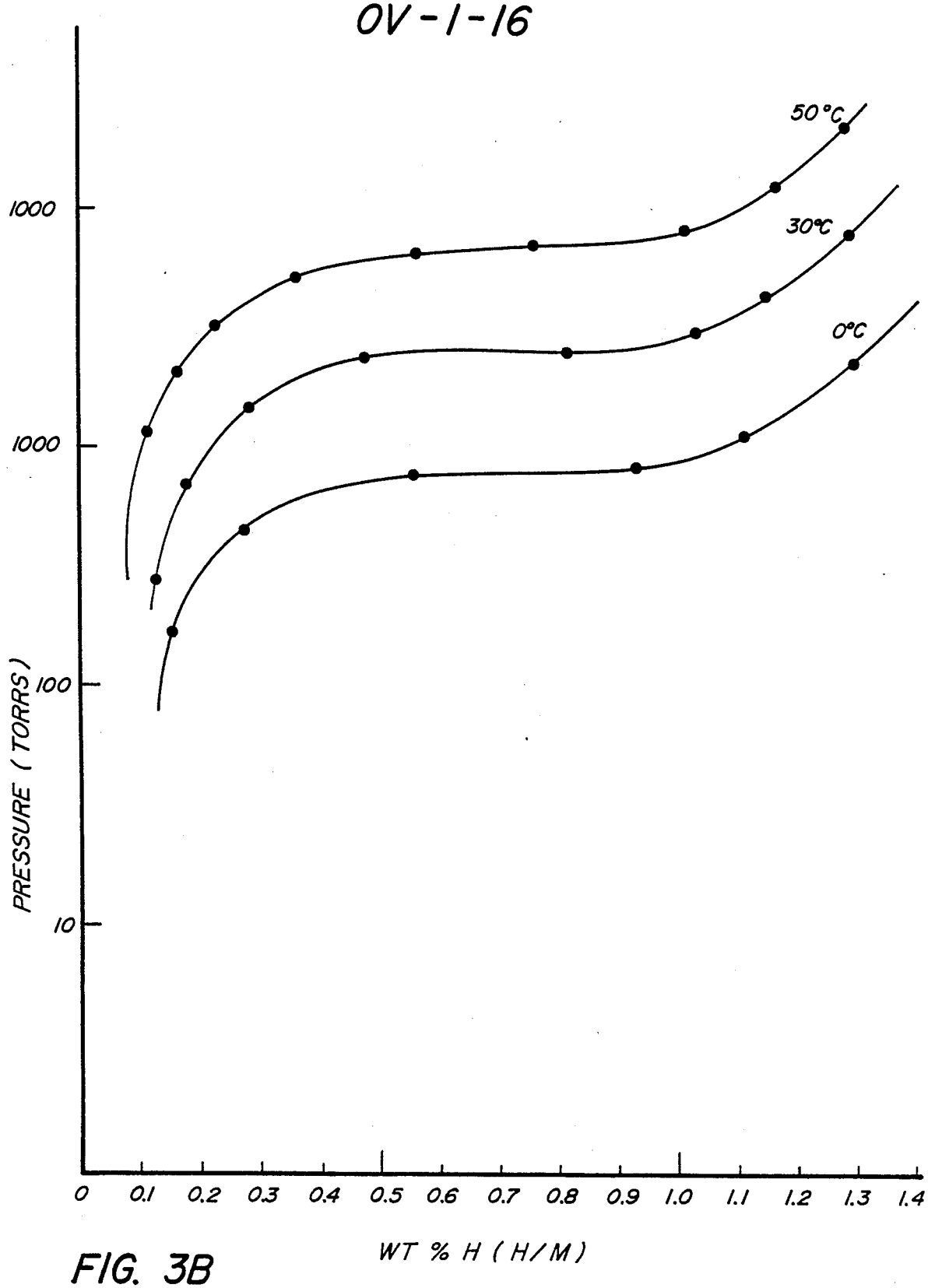
Figure 4A:
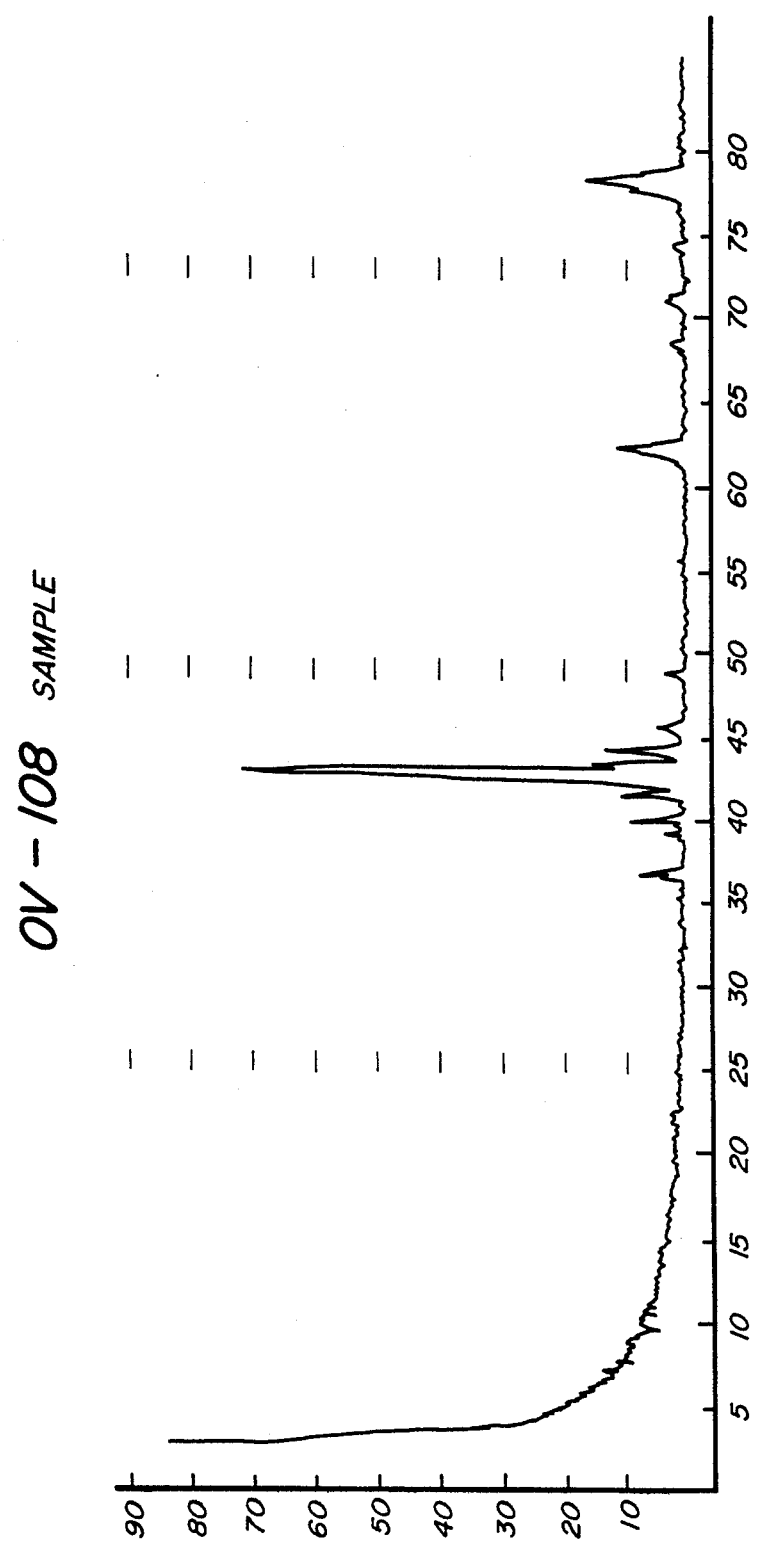
FIGS. 4a and 4b are P-C-T curves of samples of the herein disclosed materials.
Figure 4B:
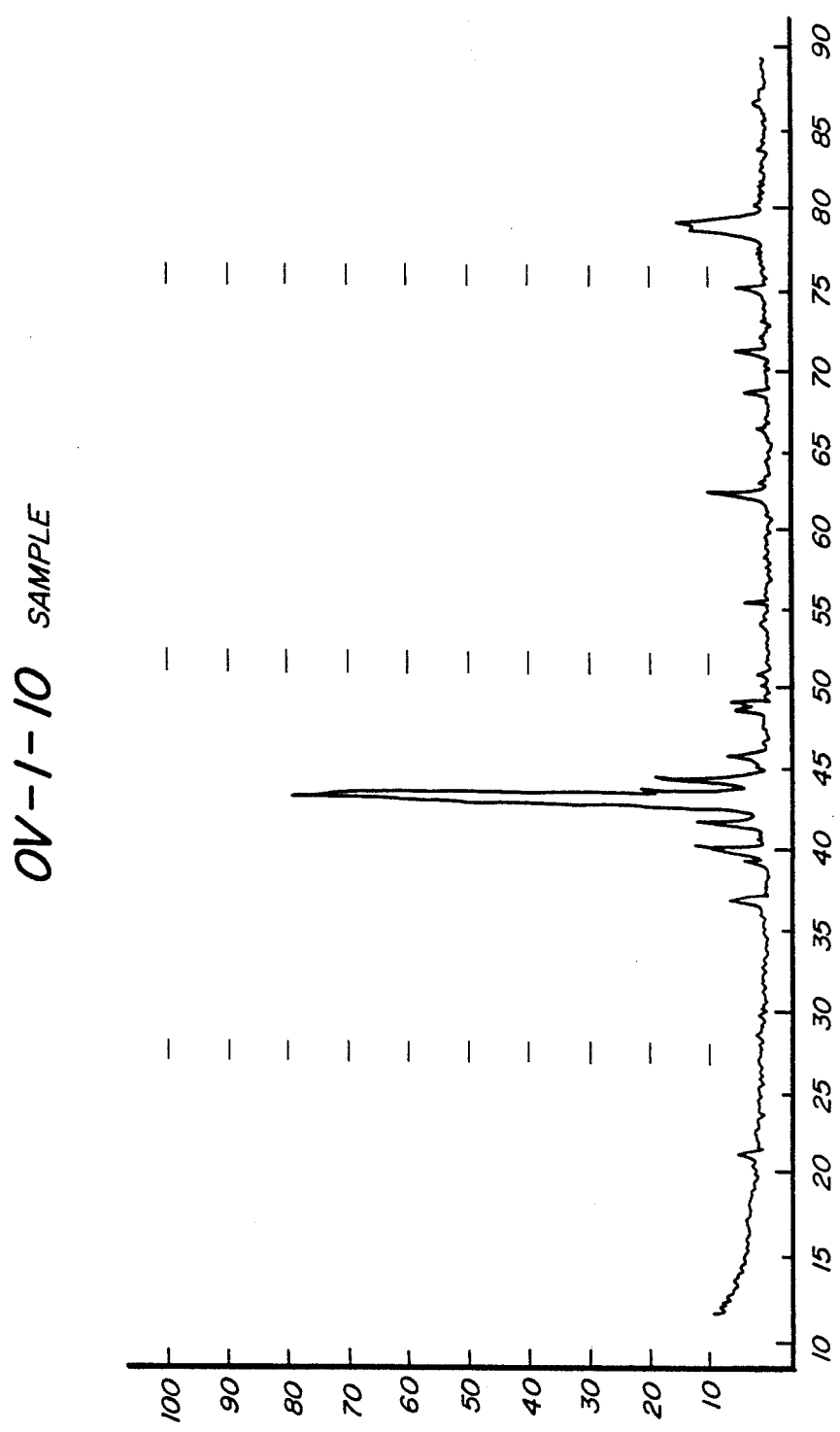

FIGS. 3a and 3b represent Bragg x-ray diffraction patterns exhibited by two samples of the material of the present invention. In FIGS. 4a and 4b, the major peak occurs at 43 degrees 2 theta. The narrowness of the peaks at half maximum intensity clearly show that the samples have a high degree of crystallinity. FIGS. 4a and 4b also show minor peaks which are characteristic of the material of the present invention. These peaks occur at 37 degrees 2 theta, at 40 degrees 2 theta at 42 degrees 2 theta, at 45 degrees 2 theta, at 62 degrees 2 theta and at 78.5 degrees, 2 theta.

FIGS. 4a and 4b are P-C-T curves showing the absorption-desorption characteristics of two samples of the materials of the present invention. These curves indicate how much hydrogen is present in the material as a function of pressure at a constant temperature. Increasing the temperature shifts the curve upward. Thus, these curves are pressure versus weight percent of stored hydrogen isotherms. For the materials of the present invention, the P-C-T curves are characterized by a slight shift upward of pressure for weight percents of hydrogen in the range of approximately 0.4 to 1.4 weight percent. Increasing the weight percent of hydrogen absorbed tends to shift the pressure slightly upward, until a point is reached where hydrogen absorption virtually ceases and the pressure rapidly increases.

A similarly shaped P-C-T curve is also characteristic of a truly amorphous material, as in Matsumoto et al referenced above. However, the gradually rising P-C-T curve of the amorphous material of Matsumoto et al corresponds to a different phenomenon than the slightly sloped curves of the material of the present invention. The disordered material of the present invention, which has a much larger range of local order than prior art amorphous material, is multiphase and polycrystalline. Such a material has complex P-C-T characteristics with desorption and absorption occurring at many phase boundaries and following a number of thermodynamic pathways. The gradually inclined P-C-T curves are the result of the superposition of many different pressure plateaus of various phases and combinations of phases. When these plateaus are superimposed and smoothed out, the curves illustrated result.

Because polycrystalline, multiphase, thermodynamically metastable materials exhibit such thermodynamically complicated behavior, it is possible for them to display combinations of properties not obtainable with either single crystal or amorphous materials. Disordered, polycrystalline materials have a menu of properties, such as absorption and desorption pressures, hydrogen storage capacity, reversibility, kinetics, and resistance to poisioning, from which may be selected those properties desired for a particular application. In the case of the material of the present invention, the elements have been selected so as to optimize the properties particularly suitable for a hydrogen storage material useful in heat pump applications. Thus, the materials have high, useful hydrogen storage capacity, rapid absorption and desorption kinetics, resistance to poisioning, and ready desorption and absorption of hydrogen at ambient or below ambient temperatures.

While the samples illustrated by FIGS. 3a, 3b and 3c were prepared by the induction melting and gradual cooling method disclosed hereinabove, other techniques may be used. The melting may be done by triarc melting. The cooling may be by rapid quench techniques, including melt spinning on a chill surface, physical and chemical vacuum deposition methods, plasma spraying, sputtering, and other such techniques well known in the art.

While the invention has been described with respect to certain preferred exemplifications and embodiments, it is not intended to limit the scope of the invention thereby, but solely by the claims appended hereto.

We claim:

1. A compositionally and structurally disordered, multiphase, multicomponent, polycrystalline hydrogen storage material capable of reversibly storing at least about 1.4 weight percent hydrogen, said hydrogen storage material:
   (1) having a Bragg X-ray diffraction pattern characterized by a major peak occurring at about 43 degrees two theta, and minor X-ray diffraction peaks at about 37 degrees two theta, about 40 degrees two theta, about 42 degrees two theta, about 40 degrees two theta, about 42 degrees two theta, about 45 degrees two theta, about 62 degrees two theta, and about 78.5 degrees two theta;
   (2) consisting essentially of Ti, V, Mn, and Fe, and having the nominal composition $Ti_a V_b Mn_c Fe_d,$ 

where $0.5 \leq a \leq 0.75$, $1.15 \leq b \leq 1.65$, $0.9 \leq a+c \leq 1.31$, and $1.6 \leq b+d \leq 2.0$, and
   (3) having a morphology comprising:
   (a) a least one major crystalline phase having a crystallite size of from about 5 to about 100 microns, and having the composition represented by the stoichiometric formula $Ti_a V_b Mn_c Fe_d,$ 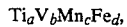

where $12 \leq a \leq 18$, $53 \leq b \leq 59$, $9 \leq c \leq 11$, and $17 \leq d \leq 21$
   (b) an intergranular phase surrounding the major crystalline phase, said intergranular phase having the composition represented by the stoichiometric formula $Ti_a V_b Mn_c Fe_d,$ 

where $31 \leq a \leq 36$, $23 \leq b \leq 26$, $10 \leq c \leq 12$, and $29 \leq d \leq 34$; and
   (c) minor inclusion phases, said minor inclusion phases including at least one inclusion phase having the composition represented by the stoichiometric formula $Ti_a V_b Mn_c Fe_d,$ 

where $48 \leq a \leq 50$, $15.5 \leq b \leq 17.5$, $6 \leq c \leq 8$, and $26 \leq d \leq 29$.

* * * * *